US011898972B2

(12) United States Patent
Iltis

(10) Patent No.: US 11,898,972 B2
(45) Date of Patent: Feb. 13, 2024

(54) IMAGING METHOD USING JOINTLY A PET RECONSTRUCTION AND A COMPTON RECONSTRUCTION, PREFERABLY IN 3D COMPTON

(71) Applicants: DAMAVAN IMAGING, Rosieres Pres Troyes (FR); A.N.D.R.A. (AGENCE NATIONALE POUR LA GESTION DES DECHETS RADIOACTIFS), Chatenay-Malabry (FR)

(72) Inventor: Alain Iltis, Troyes (FR)

(73) Assignees: DAMAVAN IMAGING, Rosiere Pres Troyes (FR); A.N.D.R.A. (AGENCE NATIONALE POUR LA GESTION DES DECHETS RADIOACTIFS), Chatenay-Malabry (FR)

( * ) Notice: Subject to any disclaimer, the term of this patent is extended or adjusted under 35 U.S.C. 154(b) by 64 days.

(21) Appl. No.: 17/620,574

(22) PCT Filed: Jun. 19, 2020

(86) PCT No.: PCT/EP2020/067232
§ 371 (c)(1),
(2) Date: Dec. 17, 2021

(87) PCT Pub. No.: WO2020/254649
PCT Pub. Date: Dec. 24, 2020

(65) Prior Publication Data
US 2022/0357291 A1 Nov. 10, 2022

Related U.S. Application Data

(63) Continuation of application No. 16/446,471, filed on Jun. 19, 2019, now abandoned.

(30) Foreign Application Priority Data

Jan. 31, 2020 (FR) ........................................ 2001009
Jan. 31, 2020 (FR) ........................................ 2001010

(51) Int. Cl.
*G01N 23/20066* (2018.01)

(52) U.S. Cl.
CPC .. *G01N 23/20066* (2013.01); *G01N 2223/401* (2013.01)

(58) Field of Classification Search
None
See application file for complete search history.

(56) References Cited

U.S. PATENT DOCUMENTS

2012/0053847 A1    3/2012  DeVito et al.
2018/0239037 A1*   8/2018  Yamaya ................ G01T 1/1647

OTHER PUBLICATIONS

Kolstein et al., M., "Using triple gamma coincidences with a pixelated semiconductor Compton-PET scanner: a simulation study," Journal of Instrumentation, vol. 11, No. 01, Jan. 19, 2016, pp. C01039-C01039.

(Continued)

*Primary Examiner* — Hoon K Song
(74) *Attorney, Agent, or Firm* — HAUPTMAN HAM, LLP

(57) ABSTRACT

A PET and Compton imaging method implemented by a device including at least two facing PET modules. The device includes a Compton camera arranged outside a plane containing the PET modules for forming a trihedron with the PET modules and producing a Compton view. The acquisition fields of the PET and Compton views having an overlap area covering the object to be imaged. The device allowing the following steps to be carried out: acquisition of a Compton view; location of a dense area and its contour on the Compton view; Computation of the 2D map of the probability of detection of the presence of a source from the Compton view of the Compton camera; Coincidence detection by the PET cameras and association of a response line (LOR); and Segmentation of LORs crossing the dense area (Continued)

by using the detection probability determined by the Compton view.

16 Claims, 13 Drawing Sheets

(56) References Cited

OTHER PUBLICATIONS

International Search Report issued from corresponding International Application No. PCT/EP2020/067232, dated Sep. 22, 2020, pp. 1-4, European Patent Office, Rijswijk, The Netherlands.
French Search Report issued in corresponding French Application No. 2001010, dated Jan. 18, 2021, pp. 1-2, National Institute of Industrial Property.

* cited by examiner 2240 cm³

IMAGING METHOD USING JOINTLY A PET RECONSTRUCTION AND A COMPTON RECONSTRUCTION, PREFERABLY IN 3D COMPTON

RELATED APPLICATIONS

The present application is a National Phase of International Application Number PCT/EP2020/067232, filed Jun. 19, 2020, and claims priority to U.S. application Ser. No. 16/446,471, filed Jun. 19, 2019, French Application No. 2001010, filed Jan. 31, 2020, and French Application No. 2001009, filed Jan. 31, 2020.

TECHNICAL FIELD

The present application relates to the field of imaging and more particularly to the imaging of gamma ray sources. In particular, the invention relates to gamma ray detection imaging system and methods combining the Compton camera type detection and the Positron Emission Tomography (PET) type coincidence detection. The invention further relates to the use of the imaging and/or detection system in the fields in particular of astronomy, industry, in particular nuclear industry, and in the medical or veterinary fields.

TECHNOLOGICAL BACKGROUND OF THE INVENTION

Currently, the imaging of gamma ray sources (whose energy is generally greater than 30 KeV) is performed mainly for medical diagnostic purposes around three techniques: PET, SPECT and Compton Camera.

The SPECT is based on scintigraphy and allows producing three-dimensional images and reconstructions of organs and their metabolism by means of a set of gamma cameras rotating around a patient. The SPECT can use several gamma ray energies, for example less than or equal to 300 KeV, but the lead collimator which allows knowing the trajectory of the rays absorbs more than 99% thereof.

The PET generally uses a ring of segmented detectors. For the PET, positron-emitting radiopharmaceutical compounds are used. These give rise to a pair of 511 keV photons, whose emission source can be located thanks to their simultaneous detection on the ring of detectors (coincidence detection). However, the radio-elements used for the PET have a short life and are therefore often expensive. The PET imaging is a functional imaging that is very attractive to guide a medical intervention with an image that clearly indicates where the source of the radiation being observed is located. This is particularly the case in Oncology where the ray emission is concentrated on tumors and allows them to be differentiated from healthy tissue. In addition, the PET imaging is also widely used in preclinical imaging on rats and mice to observe biological processes in vivo. The PET imaging is, moreover, the imaging technology that allows obtaining the most accurate images today (signal-to-noise ratio and angular resolution), for energy gamma radiations of 511 keV. Particularly, one of the key points in PET imaging is the accurate measurement of the time of flight of the 511 keV photons from their place of emission. This time of flight measurement is better when the crossed scintillator thickness is small. However, in such configurations, a large part of the photons is not detected correctly because the probability of detection increases with the crossed scintillator thickness. However, PET imagers usually consist of a complete ring around the patient (or any object) with a diameter of about 80 cm, a width of over 20 cm and a scintillator thickness of 20 mm. This ring configuration is imposed by the very small field of view of the PET. Indeed, only the interactions in coincidence between two detectors are observed therein, which imposes a reduced solid angle for each ring event. This configuration makes their use difficult to envisage in the context of a surgical operation. Moreover, the PET scanners are very expensive (in the order of two million Euros) due to the volume of detectors required. On the other hand, in the context of the preclinical imaging where the dimensions of the scanner are much smaller, the doses of radioactivity injected into the mice are very high, which can disrupt the physiological processes desired to be observed. Likewise, for interventional imaging, it would be interesting to be able to drastically reduce the injected dose (for example a dose less than or equal to 1 MBq) in the vicinity of the organ to be treated.

The Compton camera, like the SPECT, allows making an image whatever the energy of the gamma radiation, but unlike the SPECT, all the photons can contribute to the image. However, the applications of the Compton camera are still often limited today, in particular because of its cost, of the high level of noise on the images and of the difficulty in obtaining accurate reconstructions. More generally in all of the technologies above, when scintillating crystals are used to produce an image of gamma radiation sources, the problem of the probabilistic nature of the gamma photon/matter interaction is encountered. Two effects are essentially noticed. The first effect lies in the fact that the gamma photon can be absorbed at any depth on its propagation path (Depth of Interaction effect). The second effect lies in the fact that all current imaging systems (pixel array or Anger camera) are based on the postulate that the place where the maximum light emission occurs is the place where the gamma photon has been detected. Because of the Compton deviation, this postulate is correct as long as the average value of a large number of events is considered. On the other hand, in the case of a PET-type scanner, if the position of a single event is reconstituted, the error, on the position, may be of several millimeters. The solution adopted is then to reject the events for which the energy deposited is not correct. This leads to rejecting a large number of events. Solutions called "temporal imaging" solutions have therefore been developed, as described in particular in French patent applications FR2997766 and FR3013125 with regard to the PET. In addition, the concerning Compton camera technology, patent applications WO2016185123 and WO2017077164 describe systems and methods which benefit both from temporal imaging, but also from the combination of Compton imaging and PET imaging. The present application therefore proposes solutions to overcome some of the drawbacks of the prior art, in particular by aiming to provide, preferably at lower cost, devices, systems and methods whose use is as varied as possible and/or which allow enhancing the quality of the images obtained.

Furthermore, another general and constant problem in the field concerns the measurement of the time of arrival of the first photons on a given pixel, because it is important for the quality of the images obtained using the signals collected by the PET scanners and also for the temporal Compton cameras. Particularly, the first photon detected in a crystal allows measuring the temporal coincidence for an emission at 511 keV and therefore allows estimating the time of flight of the photons from the source. In addition, in a temporal imaging logic, the time of arrival of the first photons on each pixel allows determining the position of the disk (and therefore of the cone) of the non-scattered photons, which allows enhancing the accuracy of the estimation of the position (in particular in "depth", that is to say parallel to the imaging axis on which the PET detectors are aligned).

The use of monolithic crystals for PET scanners has multiple advantages, such as easy access to the depth measurement, reduced cost and high spatial resolution potential, in particular by using the information relating to the distribution of events over time ("temporal imagery", as mentioned above). The fastest scintillating crystals today are Lanthanum halides, such as CeBr3 or LaBr3: which emit up to 4 times more photons during the first nanosecond than LYSO: often used in the field today. As such, these lanthanum halides are the best candidates for temporal imaging. However, these crystals are very delicate to implement because they are extremely sensitive to atmospheric conditions (in particular hydrometry), which restricts their use in the form of monolithic crystals.

Nevertheless, the use of monolithic crystals is faced with a paradox with regard to the measurement of the time of arrival of the photons. Indeed, a priori, the measurement of the time of arrival of the first photons should be more accurate in a monolithic crystal than in a detector in the form of an array (i.e., pixelated array) of scintillating crystals, in particular due to the absence of optical deviation from the place of emission. However, in a "pixelated" detector, the first photon detected by a given pixel is very likely to have undergone multiple reflections on the lateral faces of the crystal before being collected by the photodetector and the information on the real time of emission will therefore be inaccurate, if not totally lost. On the other hand, in a monolithic crystal, once the position of the interaction is known, it is possible to determine a "disk of non-scattered photons" in which the majority of the photons detected have not undergone any disturbance (e.g., reflection) between their points of emission in the source and their collection points in the photodetector. The time of arrival is consequently more accurate. Today, however, temporal resolutions measured with monolithic crystals are lower than those measured with pixel arrays.

The present application also proposes solutions to this paradoxical problem.

Even more, the spatial resolution, signal/noise ratio of the PET imagers are limited by many factors: the thermalization of the positron, the non-collinearity of 511 keV photons, the structure of the detectors, the large proportion of the events recorded due to fortuitous coincidences, to the scattered pairs. These unwanted events affect the measurement of the activity and increase the noise in the reconstructed images.

The time of flight information makes enhancements but is limited by the accuracy of the time measurement. Theoretical studies show that if a time of flight of 30 pico seconds could be achieved, there would be no need for sophisticated reconstruction of the image, it would be perfectly clear.

Moreover, the time of flight is today not very relevant on small scanners (for example brain scanner) or small animal imaging, the scanner being less than 30 centimeters in diameter. The diameter of the PET rings being the limiting factor for very wide-field imaging (horses, etc.).

However, due to the physical mechanisms of the emission of light in the scintillators, obtaining such low times of flight with crystals thick enough to be effective (approximately twenty millimeters) is no small challenge and progress is slow.

The best current PET scanners have a time of flight of 240 picoseconds FWHM which corresponds to an average LOR length of six centimeters compared to eighty centimeters without time of flight.

In this context, it would therefore be interesting to propose PET imaging which has fewer drawbacks than the prior art, in terms of time of acquisition, speed of convergence of the algorithms, quality of the reconstructed images, and possibilities of small-field imaging (small animal type, brain type, etc.) and very wide-field imaging (horses, etc.).

DISCLOSURE OF THE INVENTION

The present invention proposes a device, system and method for PET and COMPTON 3D imaging making it possible to overcome at least part of the drawbacks of the prior art.

The "PET and Compton" or conversely "Compton and PET" imaging method, as disclosed within the framework of the present invention, denotes an imaging method using jointly a PET reconstruction and a 3D Compton reconstruction.

To this end, the invention relates to a PET and Compton imaging method implemented by a device including at least one facing PET module, characterized in that it comprises at least one Compton camera producing at least one Compton view, the acquisition fields of said PET and Compton views having at least one overlap area covering the object to be imaged.

Such an imaging method coupling the PET and at least one Compton camera allows the Compton image to be able to truncate the LORs (response lines) of the PET imaging with accuracy better than 2 cm.

According to one feature, said device allows the following steps to be carried out:
    acquisition of a Compton view;
    location of a dense area and its contour on said Compton view;
    computation of the 2D map of the probability of detection of the presence of a source from said Compton view;
    coincidence detection by the PET cameras and association of a response line (LOR);
    segmentation of the LORs crossing the dense area by using the detection probability determined by the Compton image.

The invention also relates to a PET and Compton imaging method implemented by a device including at least one Compton camera producing at least one Compton view from at least two, preferably three, positions among three known positions distributed over at least one of the three axes (X, Y, Z) of a trihedron, the acquisition fields of said views having at least one overlap area covering the object to be imaged.

According to another feature, the device described above allows the following steps to be carried out:
    acquisitions according to three distinct Compton views;
    location of a dense area and its three-dimensional contour on said Compton views;
    computation of a 3D map of the probability of detection of the presence of a source from said Compton views;
    coincidence detection by the PET cameras and association of a response line (LOR);
    segmentation of LORs crossing the dense area by using the detection probability determined by said Compton views.

According to another feature, said PET and Compton imaging method comprises an additional step of filtering the LORs crossing a dense area by considering the probability of association of a LOR with said dense area.

According to another feature, said PET and Compton imaging method comprises at least one Compton multi-capture camera.

According to another feature, in the areas of the image having high contrast, the LORs are segmented over lengths less than or equal to two centimeters (cm).

According to another feature, said PET and Compton imaging method contains a PET and Compton tomographic reconstruction method taking into account at least three distinct Compton views locating the object to be imaged, defining the contours of the dense area and guiding the segmentation of the LORs.

According to another feature, said PET and Compton imaging method contains a PET and Compton reconstruction method in which only the intersections of cones derived from 3 different views locating the object to be imaged are retained, defining the contours of the dense area and guiding the segmentation of the LORs.

According to another feature, said PET and Compton imaging method contains an additional step in which the location of the place of emission of the photons is determined by the intersection between a Compton cone and a LOR in the case for example where the radio-element emits a gamma photon in coincidence with the emission of a positron (for example 22Na, 41Sc, etc.).

According to another feature, said PET and Compton imaging method contains an additional step in which the location of the place of emission of the photons is determined for the radionuclides which are emitting at least two types of radiation, particularly a positron and a gamma ray, by the intersection between a Compton cone and a LOR.

According to another feature, said PET and Compton imaging method is capable of measuring the time of flight of the photon in coincidence with the PET emission.

According to another feature, said PET and Compton imaging method contains a Compton statistical data reduction process, used in the case where the intensity of the source is identical between several views, to filter the parasitic events for which said intensity of the source does not satisfy the law of the inverse of the squared distances, not varying as $1/d^2$ on each of the views, d being the distance from the source to the camera on each of the views.

According to one embodiment, the invention further relates to a PET and Compton imager including at least one Compton camera able to produce at least one Compton view, at least two PET cameras able to make coincidence acquisitions for the implementation of the method according to the features described above.

According to another feature, said imager includes hybrid PET and Compton cameras.

According to another feature, the Compton camera has a temporal resolution which allows it to measure the time of flight from the place of emission (case of the radionuclides generating the emission in any way of 3 photons). In this context, the intersection of the Compton cone with the LOR related to the decay of the positron gives two line segments. The times of flight measured on the two coincidence detectors and on the Compton camera then often allow excluding one of the two line segments on the basis of a discrimination based on the times of flight (TOF).

According to another feature, said imager is coupled to a third imaging modality (CT-Scan or MRI, etc.) facilitating the fusion of images for a better diagnosis.

According to another feature, at least one of the Compton cameras of said imager is mounted on at least one device provided with at least one motor which can successively and/or simultaneously move in all directions of space and be oriented at Euler angles, either in automatic mode or in manual mode.

According to another embodiment, the invention also relates to the use of said PET and Compton imager according to at least one of the features described in healthcare, in the veterinary field and in industry.

According to another embodiment, the invention relates to the use of said PET and Compton imager in order to produce images with at least one tracer able to generate photons of different energies.

According to another feature, the invention proposes imaging enhancement kits, for transforming PET, CT-Scan, PET/CT and/or PET/MRI imagers, MRI imagers compatible with the method according to the described features. Said enhancement Kit contains a device able to produce at least one view, preferably three distinct Compton views along the three directions of space.

According to another feature, said enhancement kit further contains a reconstruction module implementing a reconstruction algorithm combining the acquisitions of the PET imager and of said device with three Compton views for the implementation of the method according to the described features.

According to another feature, said enhancement kit contains a reconstruction module implementing a reconstruction algorithm combining the acquisitions of the imager and of said device with three Compton views and two PET cameras for the implementation of the method according to the described features.

According to another feature, said enhancement kit contains a reconstruction module implementing a reconstruction algorithm combining the acquisitions of the MRI imager and of said device with three Compton views and two PET cameras for the implementation of the method according to the described features.

BRIEF DESCRIPTION OF THE FIGURES

Other characteristics, details and advantages of the invention will emerge upon reading the following description with reference to the appended figures, which illustrate.

A) Width of the cone corresponding to the measurement errors;

B) Intersection of 2 cones seen by the same camera presenting two extended intersection areas;

C) Shape and volume of this intersection area corresponding to the classical case: The solution is degenerated along the line of sight.

Figure 3A:
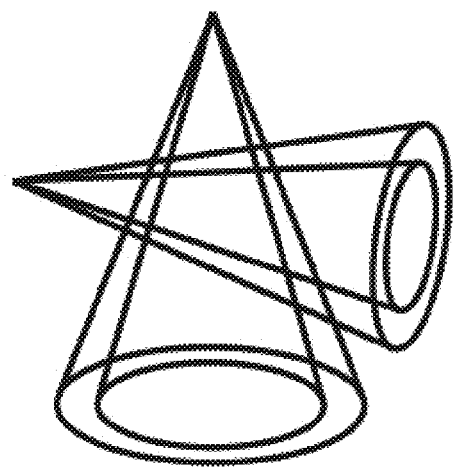

FIG. 3a is a schematic representation of two cones corresponding to two distinct views.

Figure 3B:
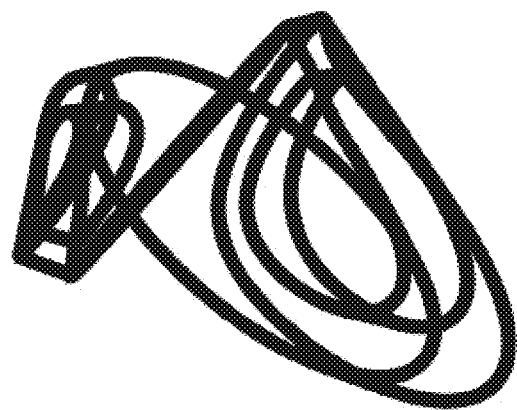

FIG. 3b is the schematic representation of the area of intersection of these two cones and its volume.

Figure 3C:
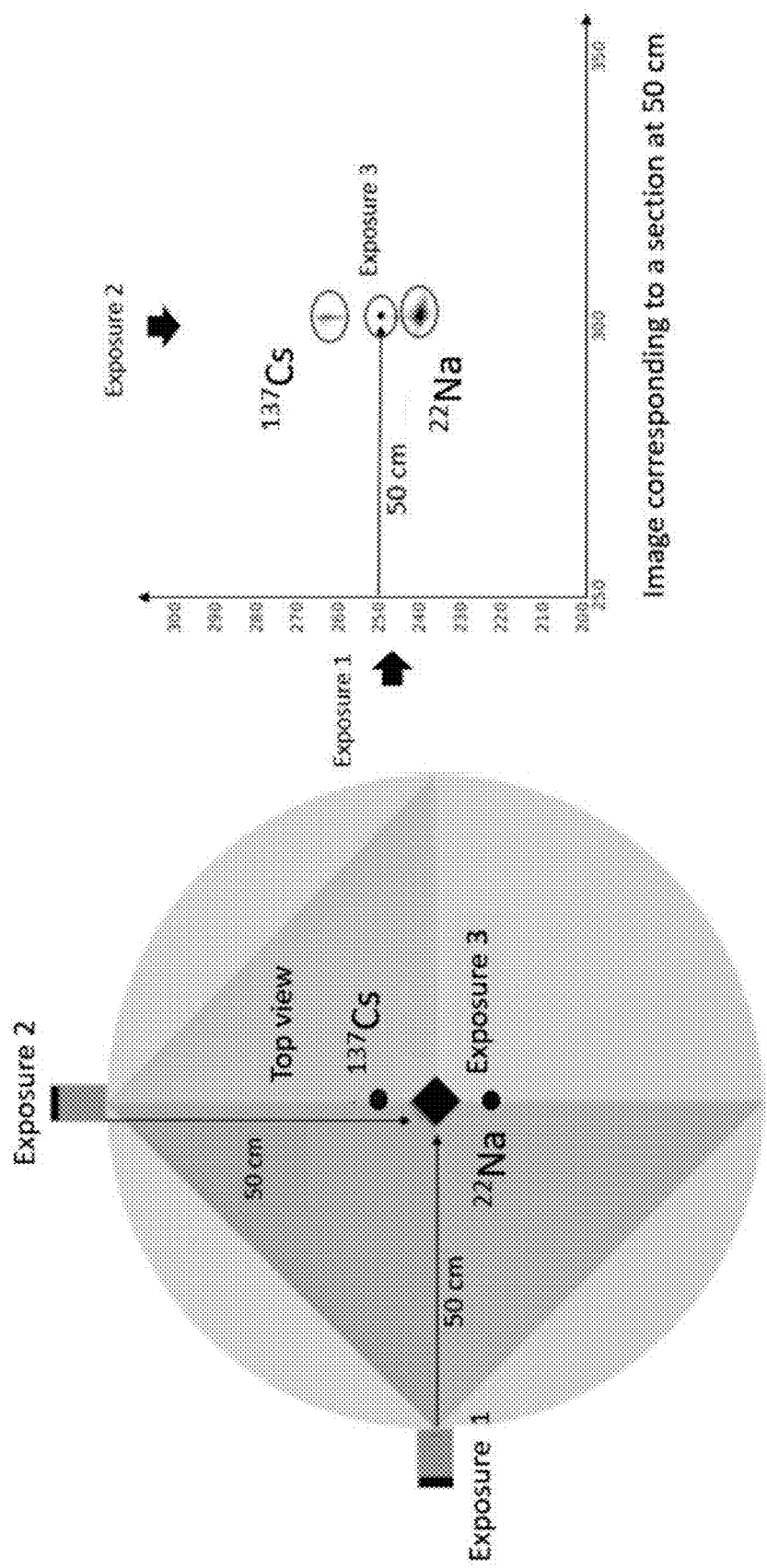
Figure 3D:
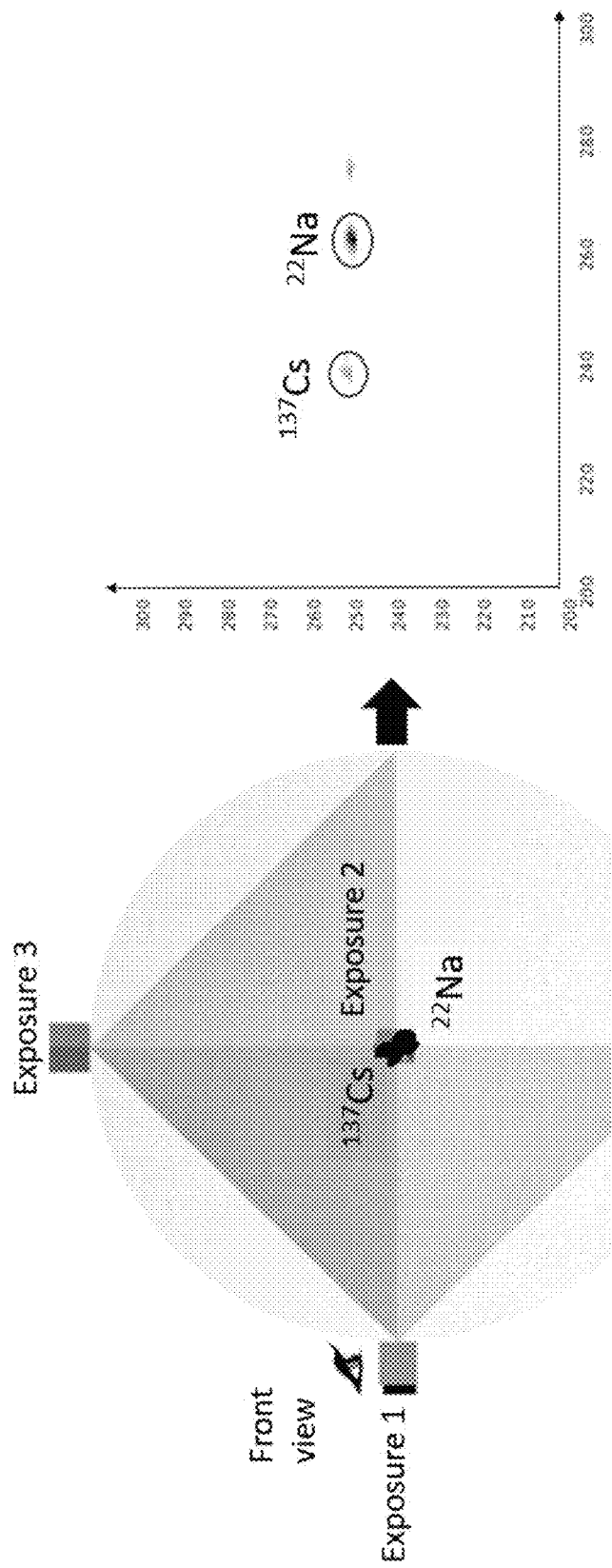

FIG. 3c and FIG. 3d are the images of two sources ($^{22}$Na and $^{137}$Cs) detected by two distinct views according to one embodiment of the invention (reconstructed image (MLM/MLEM) from said two views along the X axis FIG. 3c, along the Z axis FIG. 3d.

Figure 4:
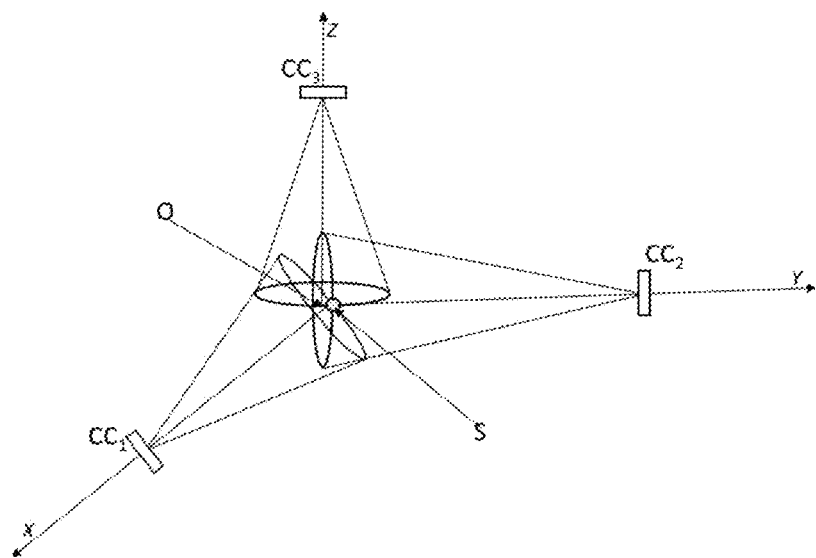

FIG. 4 is a schematic representation of three Compton cameras distributed over the three axes (X, Y, Z) of a trihedron centered in O.

Figure 5A:
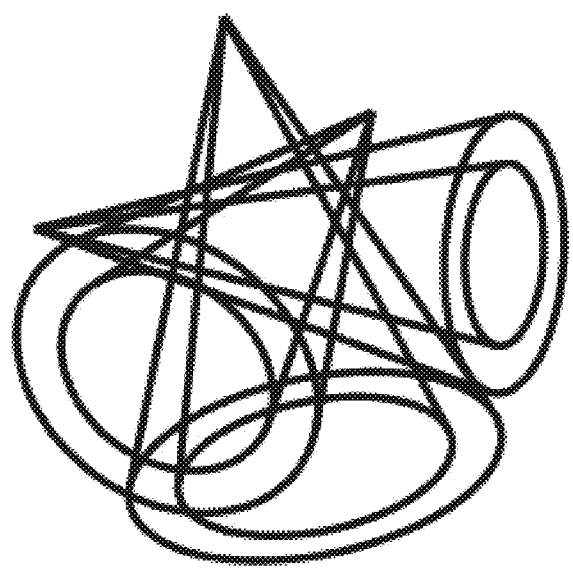

FIG. 5a is a schematic representation of three cones according to three distinct views.

Figure 5B:
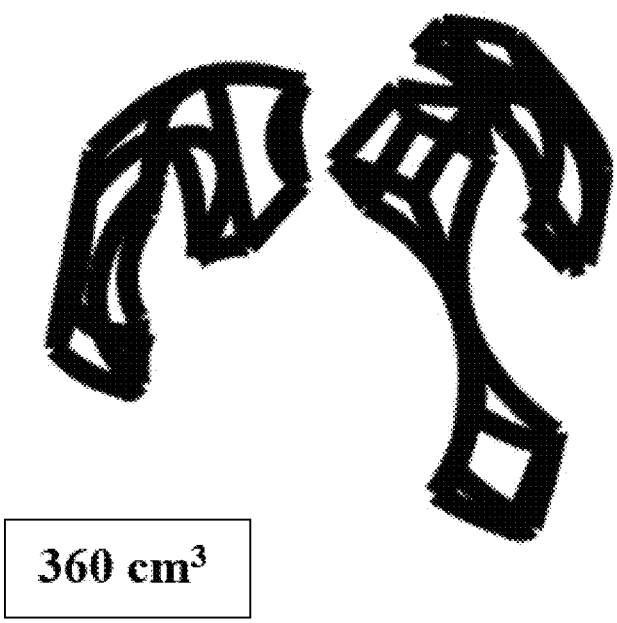

FIG. 5b is a schematic representation of the area of intersection of said three cones and of its volume.

Figure 6:
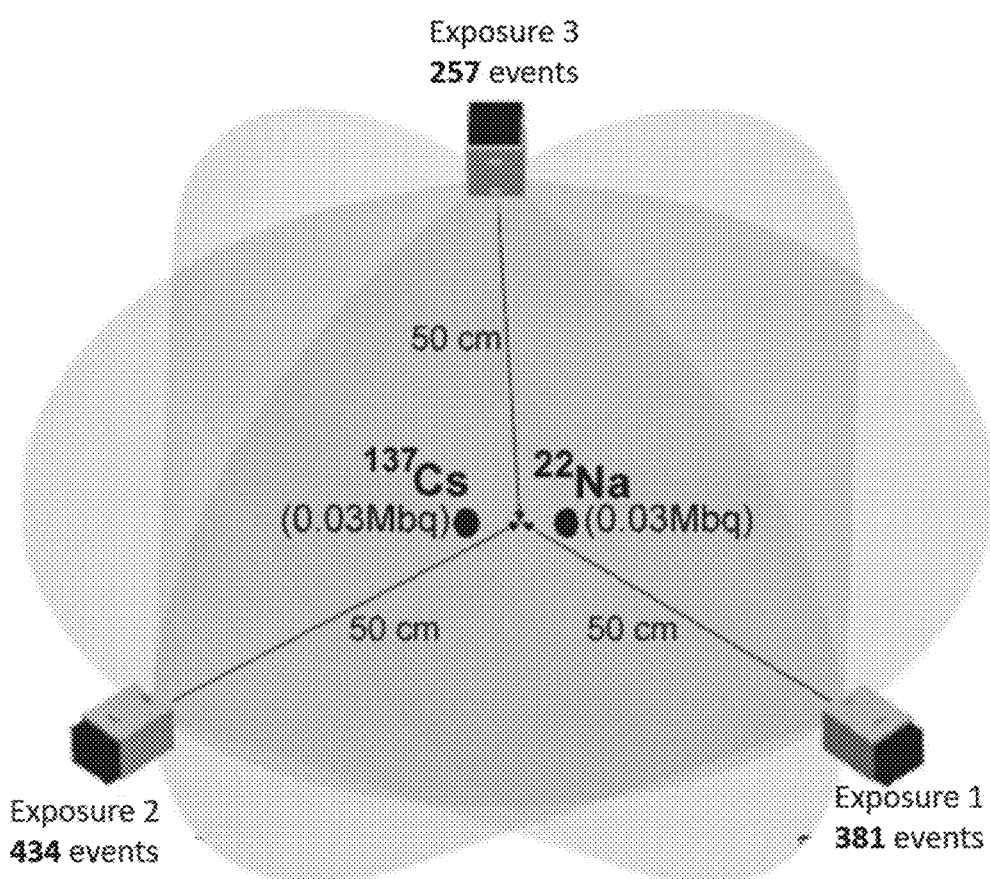

FIG. 6 represents one embodiment of the invention comprising two sources of 30 kBq, one of $^{137}$Cs, the other of $^{22}$Na separated by 15 cm and observed from a distance of 50 cm.

Figure 7A:
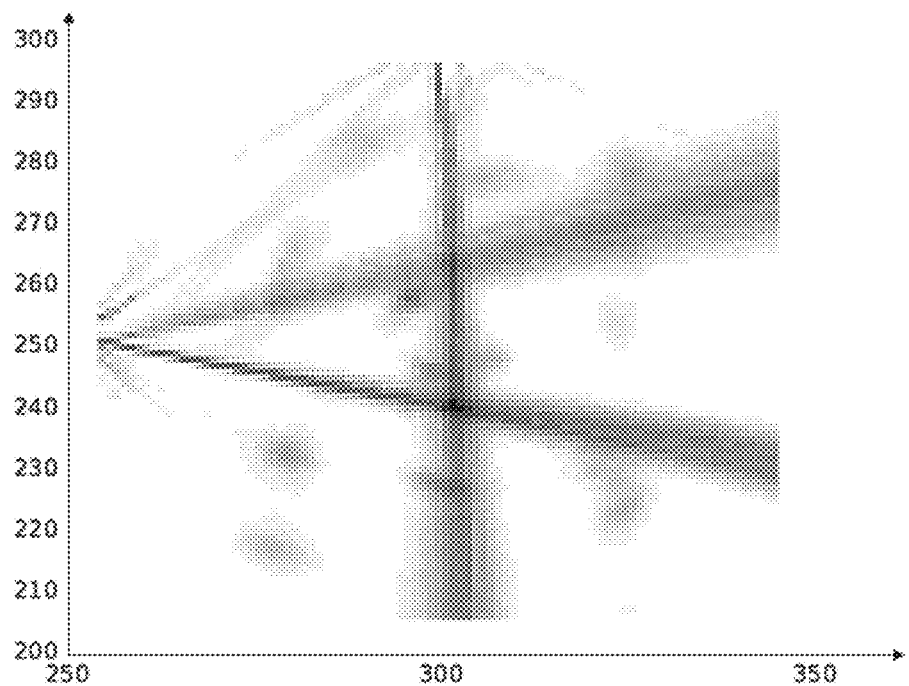

FIG. 7a represents the X-Z section obtained by "classical" 3D reconstruction by considering all the intersections between Compton cones. The position of the 2 sources is clearly visible but the image shows many artefacts.

Figure 7B:
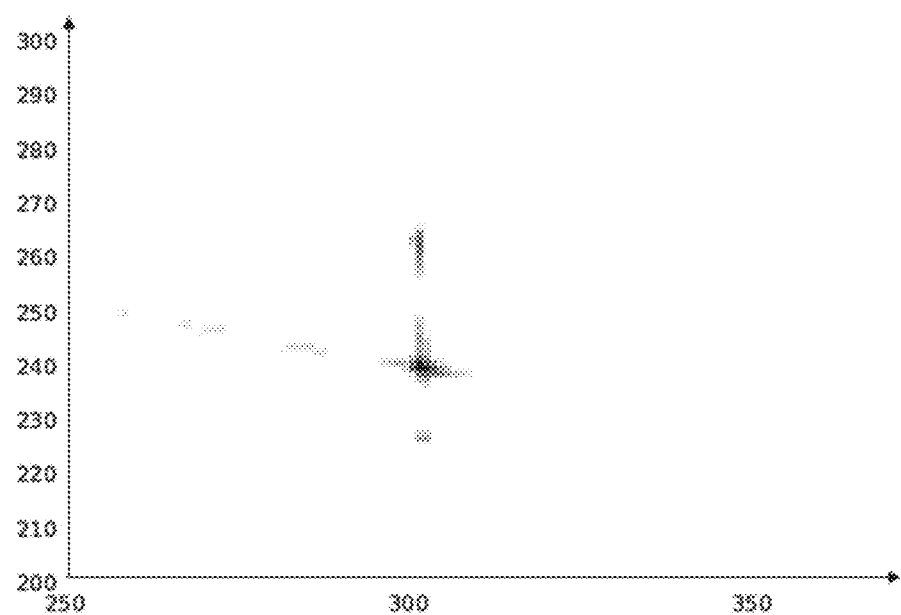

FIG. 7b represents the same X-Z section obtained by reconstruction according to the invention using only the multi-view intersections and clearly showing the position of the two sources and the virtual disappearance of the artefacts.

Figure 8:
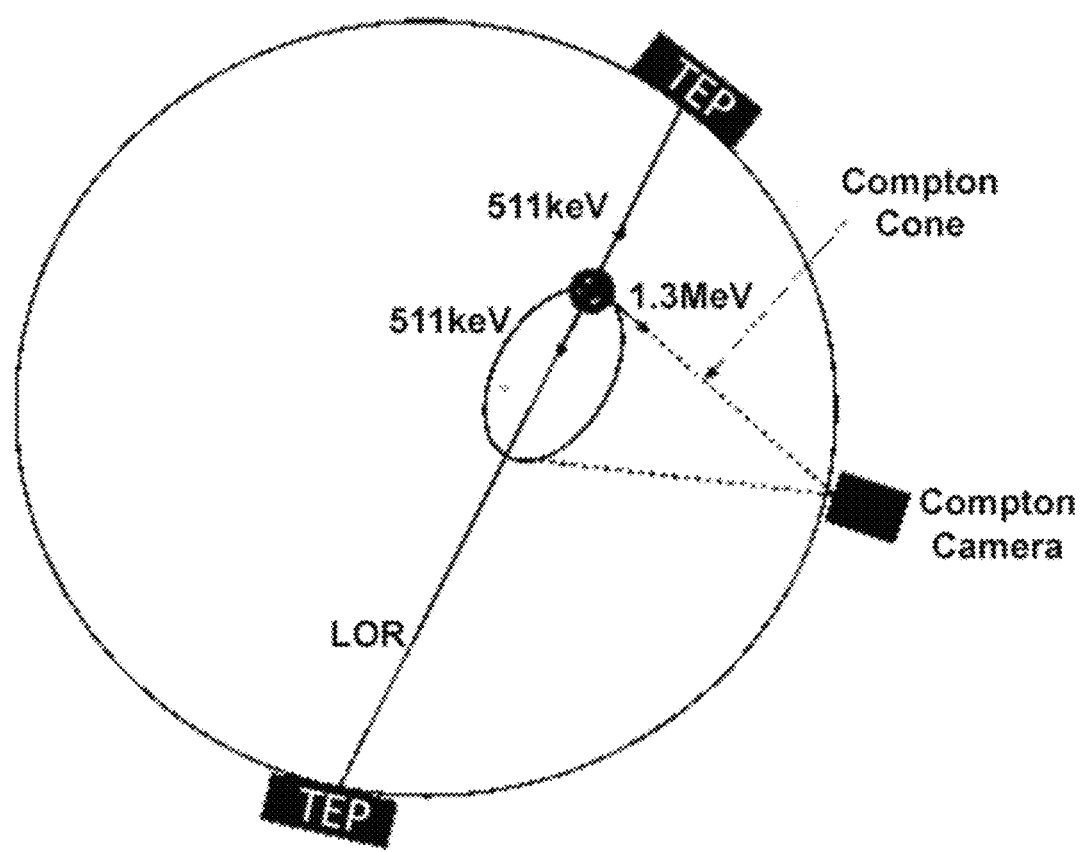

FIG. 8 is a schematic representation of a dual emission embodiment of the invention (the source of $^{22}$Na simultaneously emits 1.3 MeV gamma photons and $\beta^+$ which generate 511 keV photons) which illustrates a device containing two PET cameras each detecting a 511 keV photon and a Compton camera detecting the 1.3 MeV photon for an implementation of the method of the invention.

Figure 9:
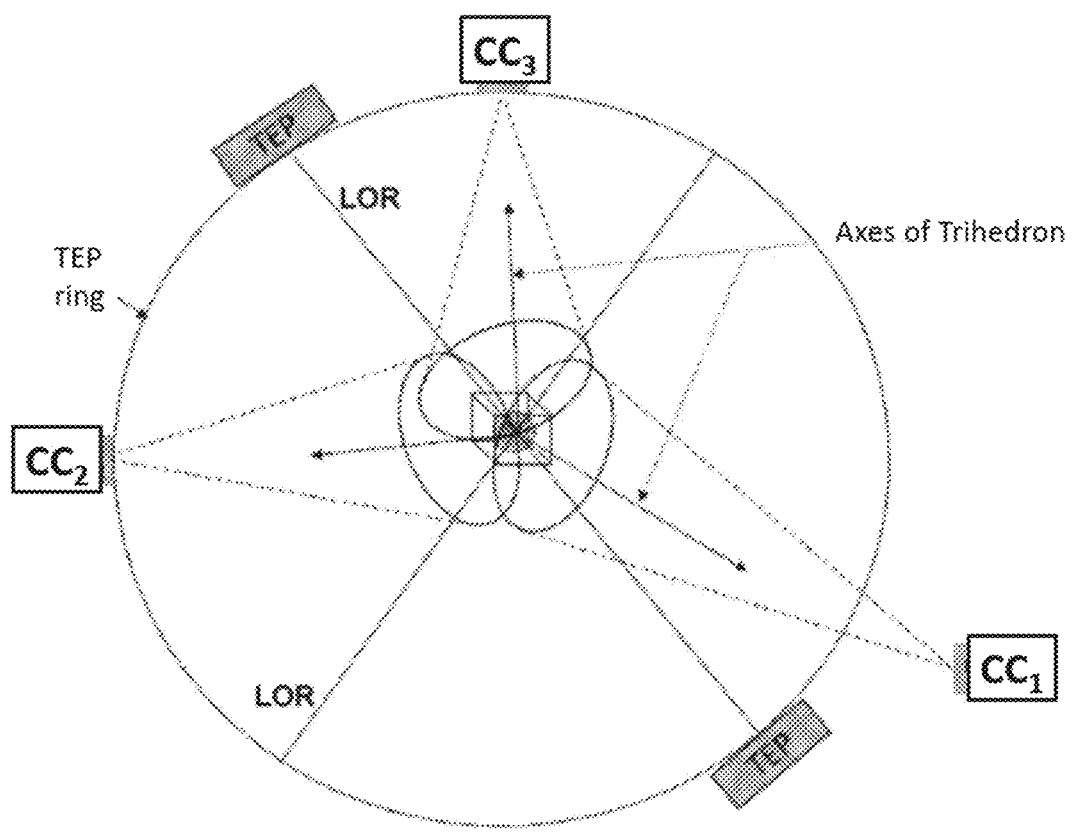

FIG. 9 is a schematic representation of one embodiment of the invention and illustrates a device containing two PET cameras each detecting a 511 keV photon and three Compton cameras locating a dense area centered on a trihedron whose origin is the place of emission of the source which coincides with the point of intersection of the Compton cones.

DESCRIPTION OF THE PREFERRED EMBODIMENTS OF THE INVENTION

The present invention relates to an imaging system and method jointly using a PET-type coincidence reconstruction and a single-photon reconstruction at the same energy (511 keV) of the Compton 3D type. By the detection of gamma radiation implemented by a device including at least one PET type coincidence detection module. The two parts of the PET module are facing each other to make coincidence detections of pairs of photons. Said coincidence depends on a time window $\Delta t$ (delta t) greater than the difference between the time of arrival $t_2$ of the second photon detected by one of the PET cameras and that $t_1$ of the first photon detected by the other PET camera ($\Delta t = t_2 - t_1$). It's a system known as Time Of Flight (TOF).

In some embodiments, several pairs of PET cameras can be mounted facing each other forming a ring, arcs, etc. The purpose sought in these embodiments being that with these arrangements of PET cameras, it is possible to target large volumes and cover large surfaces. Thus, the acquisitions are accelerated. In addition, the majority of current classical PET cameras are produced according to this ring and/or arc scheme.

In some embodiments, said device further comprises at least one Compton camera producing at least one Compton view, the acquisition fields of said views having at least one overlap area covering the object to be imaged.

In some embodiments, said device comprises one or several Compton cameras producing at least one Compton view from at least one position among three known positions distributed over at least one of the three axes (X, Y, Z) of a trihedron (FIG. 9) whose area to be imaged is at the origin, the acquisition fields of said views having at least one overlap area covering the object to be imaged.

The desired purpose being to locate and delimit the dense areas with the number of acquired views required to apply the 3D Compton reconstruction taught in an application filed the same day by the same inventor. In particular the elements above.

To this end, the invention relates to a Compton imaging method using one or several Compton cameras. Said Compton cameras produce at least three views FIG. 4, FIG. 5c (containing the capture centers CC1, CC2, CC3 FIG. 4) from three known positions distributed over the three axes (X, Y, Z) each passing through one of the capture centers of one of the Compton cameras. Advantageously, the implementation of said method allows the 3D reconstruction of the image of an object from a minimum of views, preferably three. Such an imaging method coupling the PET and at least one Compton camera allows the Compton image to be able to truncate the LORs (response lines) of the PET imaging with accuracy better than 2 cm.

One advantage of using the method of the present invention is to allow reducing the number of views necessary for the reconstruction of the image which imposes constraints (time, dose, cost, etc.). For example, multiplying the number of views has a cost, either in dead time if the camera needs to be moved in order to get enough views, or in equipment cost if an equipment that takes multiple views simultaneously is used.

By reducing the position uncertainty by acquisition, the implementation of the method of the present invention allows cumulating the advantages of the detection mode of the Compton cameras, of the original and novel method for selecting the photons required to reconstruct the 3D image.

According to one feature, the method of the present invention includes a 3D Compton reconstruction step requiring less than 10 photons/voxels to reconstruct the image. This is in part due to the finesse of our photon selection method which, by reducing the position uncertainty by acquisition, enhances the accuracy of location of the reconstruction gamma photons.

According to another feature, said method allows, with very few photons in comparison with current classical tomographic imagers, reconstructing 3D images of better or at least equivalent quality. Thus, by making a simultaneous acquisition of the three views, the time, the dose and the cost generated only by the care, without taking into account the equipment, are reduced significantly, for example in the medical field.

Another not insignificant advantage which results from this enhanced accuracy of location during the implementation of the method is that it induces the significant reduction in the acquisition times.

In addition, avoiding the many constraints related to mechanical collimators is advantageous and also allows having large fields of view on the object to be imaged. This advantage used in the present invention makes it easy to entirely cover the objects of large and small sizes to be imaged with a minimum of views.

The electronic collimation of Compton cameras enhances sensitivity, compared for example to Anger cameras because it accepts photons, regardless of their angle of incidence. It is also much more robust to disturbances by secondary sources and/or sources outside the field. Indeed, it is possible to exclude from the reconstruction the cones which contain a source secondary to the one to be studied, for example a source outside the measurement field. By performing such a processing, an image is obtained and a counting rate of the main source very similar to what is obtained in the absence of a secondary source. This electronic collimation is therefore able to exclude unwanted sources or photons and retain only those useful for the reconstruction of the image for a gain in quality and time.

According to one feature, the method of the present invention includes a 2D (or even 3D) Compton reconstruction step requiring less than 10 photons/voxels for reconstructing the image. This is in part due to the finesse of the photon selection method which enhances the accuracy of location of the reconstruction gamma photons for a better image with fewer counts compared to the classical imagers of the same type.

In one embodiment, in a non-limiting manner, it is possible to produce a 2D image from a single fixed position, that is to say a single acquisition (planar mode) or 3D image with a second acquisition position.

In another embodiment, it can also be envisaged to make one or several tomographic (axial or longitudinal) reconstruction(s) using the tomographic mode.

It may be difficult in some cases, using only one or two views, to define all the contours of an object to be imaged, which contributes to inducing in the reconstructed images a certain number of artifacts. With fewer than three views sampling all three directions of space, information may be missing or poorly resolved for the 3D reconstruction of an object. Two simultaneous views, even close enough to the same object, however allow overcoming the indetermination in depth in the Compton reconstruction and have many advantages (enhancement of the signal/noise ratio, reduction of the artefacts.).

Figure 1:
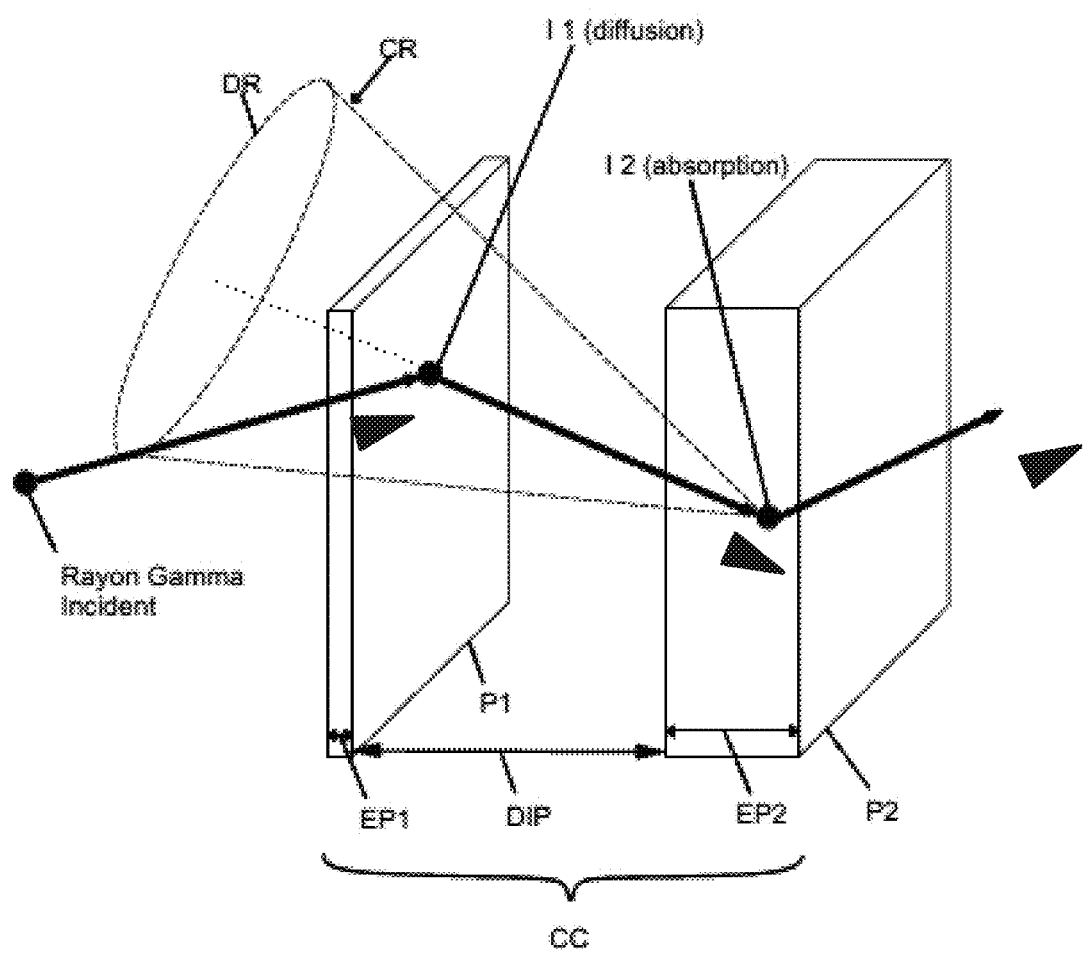
FIG. 1 is a schematic representation of a classical Compton imaging of the prior art.

According to one feature, a 3D Compton reconstruction is made from three views, each sampling one of the three directions of space. The times of acquisitions and the numbers of counts according to each view defined to the discretion of the user. As illustrated in FIGS. 1., I1 and I2 are the two interaction points and the scattering direction is given by the line d (I1 I2) passing through I1 and I2. The absorption point I2 apex of the Compton cone is the reference point locating the position of one of the views on one of the axes, the three axes forming a trihedron whose origin O FIG. 4 is the point of intersection of said axes.

Figure 2A:
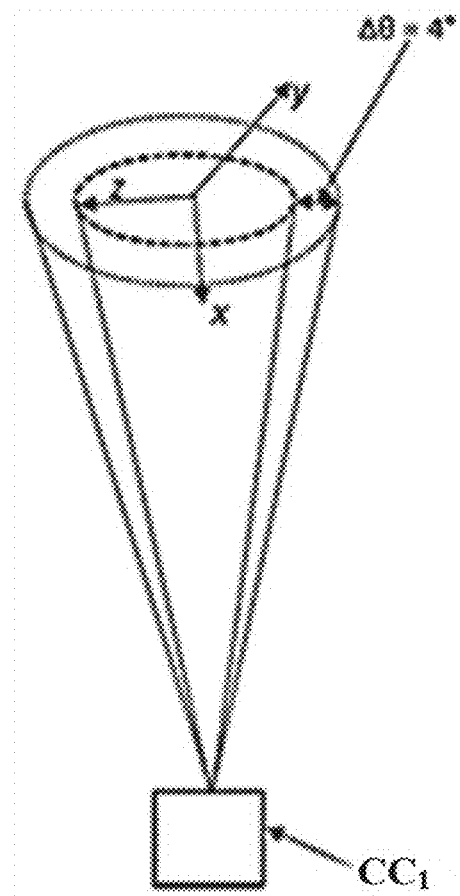
FIGS. 2a-2c are schematic representations of the "classical" reconstruction of one of the directions of the trihedron (one view=X), from left to right.

The accurate location of the place of emission of the detected photon is of crucial importance. For an ideal measurement according to one view, the origin of the absorbed photon is obtained on the surface of the Compton cone (cone of apex I2, of axis d (I1 I2), and of half aperture angle theta FIG. 1. By taking into account the measurement uncertainties, the origin of said photon no longer rests on the surface of the cone, but is located inside a volume surrounding this surface FIG. 2a.

Figure 2B:
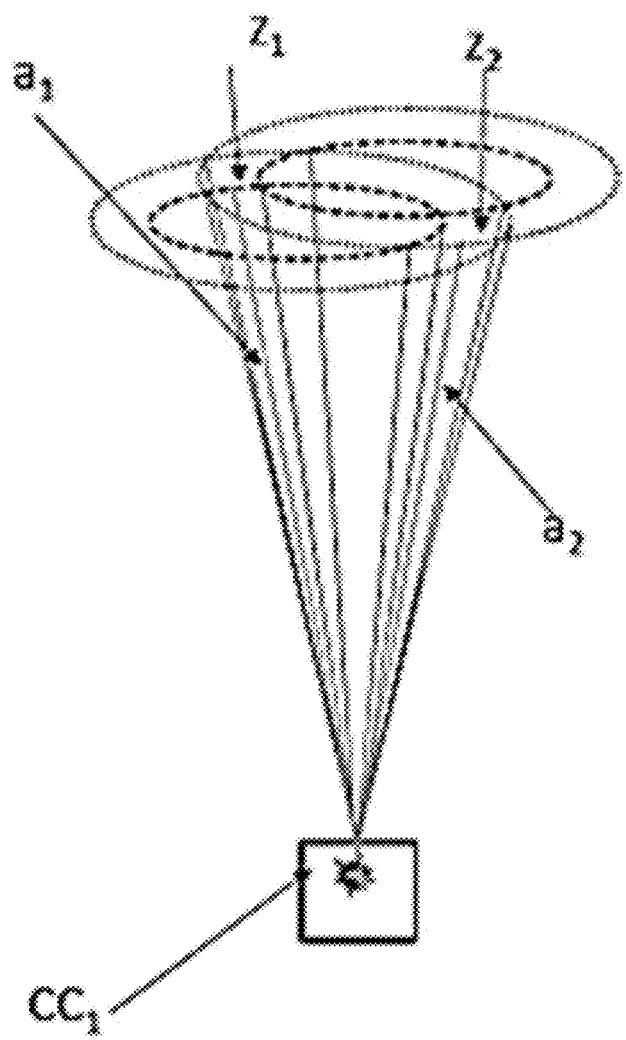
Figure 2C:
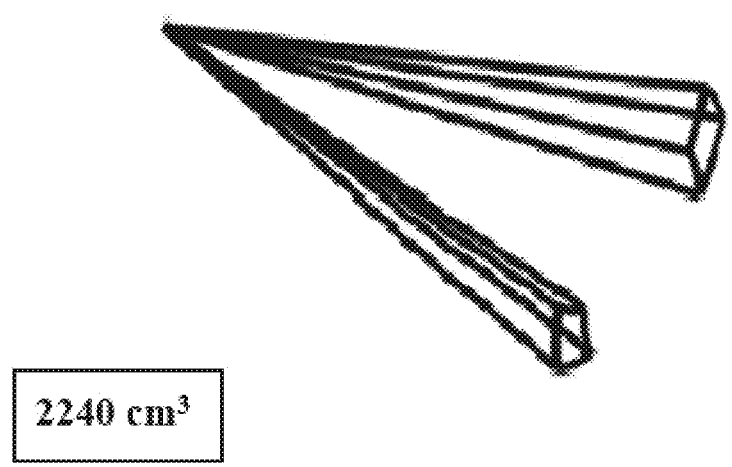

With two interactions a1 and a2 of two detected photons derived from the same source (S) detected by the same Compton camera, on the same view (1D mode), two extended intersection areas (z1 and z2) of the Compton cones FIG. 2bare obtained, showing the degeneration of the solution along the shooting axis of the Compton camera used. This degeneration induces many artefacts mainly the artefact from the phantom source in a reconstructed image. Another advantage of the method of the present invention is that it allows overcoming said degeneration.

The size of the intersection volumes of the cones in Compton imaging affects the speed of convergence of the reconstruction algorithms used.

The 1 D, 2D, 3D modes described below must be understood as being the number of spatial shooting directions (s). 1D mode for shooting(s) in only one direction; 2D mode for shooting(s) in 2 directions: and 3D mode for shooting(s) in three directions.

1 D Mode (Shooting(s) in Only One Direction)

According to one variant, two gamma photons derived from the same source are detected by a Compton camera along one of the axes of the trihedron (1D mode). For a classical Compton reconstruction (in 1D mode), the intersection volumes of the cones are quite large. For example, 2,240 cm$^3$ for the intersection volume following a view FIG. 8.c.

2D Mode (Shooting(s) in 2 Directions).

According to another variant, the two gamma photons are detected either by two different Compton cameras, each along one of the three axes of the trihedron, or by a single Compton camera able to successively produce two views, each along two different axes of the trihedron (FIG. 3a; FIG. 3b).

Such an arrangement of the Compton cameras allows having two distinct shootings along two axes of a plane passing through the object to be imaged, the details of the object to be imaged are better circumscribed, better defined and better resolved than in 1D mode.

With two views along X and Y at 90° to each other, there is a volume of interaction of the Compton cones of 1327 cm$^3$ FIG. 3b lower than the one obtained from the intersection of the Compton cones in 1D acquisition. Moreover, many values of X and Y are excluded, the solution is no longer degenerated along the observation axes. One advantage of this embodiment is to accelerate the convergence of the reconstruction algorithm.

FIG. 3c and FIG. 3d are the views and the images, of the classical 2D reconstruction, obtained from views along X and along Y at 90° to each other. All intersections between the cones are considered valid. The views are taken along the X and Y axes and the image shown along the Z axis where there is no observation.

One of the advantages of this embodiment (classical 2D reconstruction) is to highlight three problems, an artefact line along the axis of view, the image of the point source is not spherical and has a distortion along the same axes as the artifact, the image computation time is very long.

A smoothing can then be envisaged to reduce artifacts and for better statistics, but they will remain problematic in the case of an extended source whose shape is desired to be reconstituted.

FIG. 3c and FIG. 3d show that this defect is reduced when observing along the X or Y axis where the observations (views) are made. These defects are of various origins, the poor definition of the contours of the object to be imaged induces naturally smaller defects at the viewing angle but greater defects if not in the viewing axis, the intersection of the wall of the cone (for example derived from Y) which does not contain the source with the viewing angle (X in this case). Indeed, the shooting angle is dense in cones along X, but poor in intersection of cones derived from Y.

In this embodiment, two interesting phenomena are highlighted, the size of the spot which contains the source is reduced compared to an observation along a single axis (the spatial resolution is greater).

One advantage of this embodiment is that it allows correctly positioning the object with a very low number of photons (only ten per voxel against fifty for an image on at least one single view, for example).

According to another feature, only the intersections of cones originating from the X and Y views in the reconstruction are considered. All X-X and Y-Y intersections are eliminated, which has the effect of enhancing the source location accuracy, speeding up the algorithm convergence, and reducing the artifacts due to phantom sources.

According to another feature, an observation along the Z axis further reduces artifacts. Indeed, with this complete observation, there is no longer a particular direction according to a view and the artifact is much less marked. Thus, one solution proposed by the method, in order to limit this problem, is to observe the system along the Z axis.

3D Mode (Shooting(s) in Three Directions).

According to another variant, three gamma photons derived from the same source are detected, either by three different Compton cameras, each along one of the three axes of the trihedron (FIG. 4; FIG. 6), or by a single Compton camera able to produce three views, each along three different axes of the trihedron, or by two cameras, one producing a view along one of the axes of the trihedron and the other successively producing the two other views respectively on the other two axes of the trihedron. The purpose of these different options in arranging the Compton camera is to cover all the possible configurations to ultimately allow obtaining three distinct shootings along the three axes of a trihedron.

According to one embodiment, the views can be acquired, either simultaneously by three distinct Compton cameras, or sequentially by a movement of at least one Compton camera on said 3 axes X, Y and Z of the trihedron.

According to one embodiment, the place of emission (S) of the detected photon coincides with the point of intersection (O) of the X, Y and Z axes, origin of the trihedron FIG. 4.

According to another embodiment, said trihedron is a trihedron with orthogonal X, Y and Z axes defining three directions of space. Three views along the three directions of space constitute optimal conditions of observation for a given source located at the origin of said trihedron. In the case where the field of view is transparent to radiation, the views above and below are equivalent in information, and are those where the axes joining the source to the camera constitute an orthogonal trihedron.

In one embodiment, the source is simultaneously observed along the 3 axes of the trihedron and only the intersections which comprise the three viewing angles are considered, in the most general case there are only 8 possible temporary solutions for the source in space, 8 restricted areas if the cones have a certain thickness due to the uncertainties FIG. 3a.

In the case where the 3 shootings are made in such a way that the angle of the trihedron between the 3 cameras and the position of the source is of 90°, there are two possible position areas that are in a range of distance from each of the relatively small views. The solutions are no longer degenerated in any direction. The volume of the area of the solutions is smaller than in 1D and 2D modes. With three views, the volume of interaction of the Compton cones FIG. 5b is of 360 cm$^3$, approximately 20 times lower than the one obtained from the intersection of the Compton cones in 1D and 2D mode. This further accelerates the convergence of the classical reconstruction algorithm used. In addition, the spatial resolution of the reconstructed images is enhanced by shifting from a 2D reconstruction to a 3D reconstruction.

According to another variant of embodiment, the method contains a Compton reconstruction method in which only the intersections of cones derived from different views are retained. One of the advantages being, for example, the enhancement of the source location accuracy which allows better reduction of the phantom source artifacts in the reconstructed image.

If 2 intersections of cones in 3D mode containing the same source but corresponding to two different groups of photons are compared, the probability that the "phantom" solutions coincide is very low. The reconstruction technique will therefore converge with a very limited number of photons. (To a lesser extent this is also the case when considering all intersections).

An imaging technique based on a probabilistic approach which requires a large number of photons (fifty for a 1D image with one view or 2D/3D images with two views) is shifted to a quasi-deterministic imaging technique which could provide a correct image with less than ten photons/voxels. Another advantage resulting therefrom is to allow detecting with certainty a low contamination with a reduced number of photons.

The voxel being the unit of the volume image whose geometry can vary as desired in a non-limiting manner (cubic, cylindrical, spherical, etc.).

Another advantage of imposing the presence of cones coming from the 3 views in order to consider an intersection area as valid, is that this will considerably accelerate the convergence of the back-projection algorithm by removing the irrelevant areas to locate the source.

Another advantage is that this reduction in the uncertainties leads to reducing the dimensions of the spot which contains the image of the source. With three views there is a better angular resolution of the Compton camera.

According to another variant, said Compton imaging method further contains a Compton statistical data reduction process, used in the case where the intensity of the source is identical between several views, to filter the parasitic events for which said intensity of the source does not satisfy the law of the inverse of squared distances, not varying as $1/d^2$ on each of the views, d being the distance from the source to the camera on each of the views.

When a given source is observed simultaneously from several points or if the intensity of the radiation source is not significantly variable during the observation time and the relative positions of the shootings in space are precisely known, it is possible to exclude some of the solutions derived from the intersections of cones by taking into account the law of variation of the number of photons detected with the distance.

Particularly, if the views of the source are simultaneous, particularly if the absorption of the radiation is negligible, it is possible in most cases to determine which of the two solutions is the correct one because the number of photons detected by each camera should vary as 1/d2 depending on the remoteness from the source, which is generally not verified for the "phantom" source.

The use of this 1/d2 rule allows excluding a certain number of solutions mainly those which are generated by the phantom sources.

Another variant of use of this 1/d2 rule allows in the present invention refining the results of photon flux metrology, of activity measurement, of accurate location and identification of various types of sources and hot points.

In the case where the object to be imaged has significant absorption of the radiation, the views along the X axis and along the –X axis are not necessarily equivalent and must be observed. In this case, it may be necessary to produce 6 views, or even more, depending on the extent of the absorption of the radiation.

On the other hand, the attenuation due to the scattered radiation (medical imaging) is not a problem since it is possible to obtain quantified images of the scattered radiation, in particular thanks to the angular resolution.

The present invention further relates to a Compton imager including at least one Compton camera, able to produce at least three successive or simultaneous views and implementing the Compton imaging method according to the features described above.

Said dense area can be located by using a Compton view, two Compton views, preferably at least three Compton views, the location accuracy along the line of sight of the Compton camera being low. In addition, with at least 3 Compton views, the artifacts are reduced, the contours are better defined, and the 3D Compton reconstruction is faster and much better.

According to another embodiment, said device comprises at least one multi-capture Compton camera (using at least two positions of Compton imaging captures produced from at least two different locations). This embodiment makes it easier to define a desired geometry in order to delimit the localized dense area. For example, for a view produced with a binocular Compton camera (two capture heads), it is easier to define cylindrical geometries for the voxels of said dense areas located by these binocular Compton cameras. This enhances the quality of the reconstructed images.

According to one embodiment, said device is able to locate a dense area by using the intersection of the cones derived from various distinct views and able to delimit the contour of said dense area (FIG. 9).

According to one embodiment, said device is able to quantify the activity present in said dense area by counting the number of cones and thus to estimate the distribution of the radiotracer in said dense area.

According to another embodiment, said device is able to make coincidence detections by the PET cameras and to associate a response line (LOR) with each one (FIG. 8).

The 3D Compton reconstruction described above is used to reconstruct the 3D image of the localized dense area and then compute a 3D map of the probability of detection from the image.

The 3D Compton reconstruction gives a 3D density map of the valid interactions (multi-views for example) derived from the detected Compton events. This map allows computing voxel/voxel a map of the probability of presence of gamma emission in this voxel. The filtering is carried out by assigning the associated probability to each segment of the LOR PET crossing the Compton voxel. This filtering process is similar to the one used in Time of Flight type PET scanners. In these scanners for each LOR, a source position probability distribution is defined as a function of the relative times of arrival of the photons on the two coincidence detectors.

In the case of a point source isolated in space, assuming a spatial resolution of the Compton camera of one centimeter (cm) on each 2D view, for example in imaging with a remote detector of about 30 cm, the source can be positioned in a 3D voxel of one cubic centimeter ($cm^3$). In this case, the intersection of the LOR of a PET with this voxel will give a line segment with a length of 1 cm FWHM. This length corresponds to a time of flight of light of 30 pico seconds (ps).

According to one embodiment, said device is able to select a beam on the basis of a plurality of LORs and of the area of intersection between said beam and said dense area. The spatial resolution of a Compton camera is an angular resolution. The closer to the detector, the smaller the spatial resolution. In the case of an imaging specific to an organ, for example the brain, if it is possible to approach the Compton camera at 10 cm from the organ, the spatial resolution of the Compton image will then be of 3 mm, which would be equivalent to a TOF of 10 ps According to one embodiment, the PET and Compton imaging method comprises an additional step of electronically filtering the LORs crossing a dense area by considering the probability of association of a LOR with said dense area.

According to one embodiment, said device is able to segment LORs of the beam crossing said dense area. By delimiting said dense area where there is a high activity concentration, the source is located. Then, by segmenting the LORs crossing said dense area along its contours, the uncertainty on the real source position is reduced. This step of the method is decisive in optimizing the position of the source, allows producing a very accurate local image, accelerating the reconstruction algorithms, reducing the dose required for the imaging.

In PET imaging, the time of flight information is useful for enhancing the image quality, the acquisition time, for reducing the dose, etc. The best current PET imagers have a time of flight of 240 ps FWHM which corresponds to an average LOR length of 6 cm. This length is large compared to the intrinsic spatial resolution of the scanners on the order of three or four (3~4) millimeters (mm). Therefore it is not possible to obtain an image directly by positioning the line segments in space. One has to go through a sinogram and a complex reconstruction process. However, the 6 cm length considerably enhances the spatial resolution of the reconstructed images. The LOR segmentation method of the present invention based on the contours of the dense area located by the Compton cameras allows obtaining LORs of 1 cm which is impossible for the current imagers and contributes to reducing artefacts and enhancing the spatial resolution. Indeed, an essential contribution of the Compton cameras to the device is to allow the production of an accurate 3D Compton image of the dense areas of sizes of about 1 cm for a point source and their location. Also, the temporal resolution of our cameras (<250 ps) facilitates the implementation of the method of the present invention because it is possible to obtain a measurement of the time of flight between the emission and the Compton camera in the case where an event is detected by the PET.

According to another embodiment of the invention, a single Compton view is required to locate the source. The LORs derived from the PET scanner are intersected with a "two-dimensional" Compton image acquired from a single Compton view. In this embodiment, the position of the source will be accurate (at 1 cm for example) in the direction perpendicular to the sight of the camera (X, Y) and degenerated along the line of sight (Z axis).

According to one embodiment of the invention, in the case where the source emits a gamma photon at the same time as a positron ($^{22}$Na, $^{41}$Sc, etc.) only one Compton view is necessary to locate the source. The two 511 keV photons having been detected jointly by the PET cameras and the third photon having been detected by the only Compton camera in the same time window.

This embodiment is suitable for radionuclides which simultaneously emit two types of radiations, beta plus ($\beta^+$) and gammas ($\gamma$), for example $^{22}$Na, $^{41}$Sc, etc. For this type of radionuclides, two photons of 511 keV are detected and a third photon of different energy (1.3 MeV for $^{22}$Na for example) also emitted during the disintegration (decay) of said radionuclide. The very good temporal resolution (<250 ps) of some Compton cameras, equivalent to that of PET cameras, allows the detection of the three events by measuring the times of flight between source/PET detectors but also source/camera.

As described above, the 3D location of a source can be achieved by at least three distinct views.

The two 511 keV photons are detected jointly by the PET cameras and the third photon detected by the Compton camera in the same time window. The intersection made between the Compton cone derived from the Compton camera and the LOR joining the two PET cameras gives the place of emission of the three detected photons. The three vents all derived from the same atom also give here a quasi-deterministic location of said place of emission (two areas of intersections cone/LOR).

Furthermore, the measurement of the times of impact of the photons on the two PET detectors and on the Compton camera allows estimating the source/detector distance on the LOR and on the cone. A cone slice for the Compton must therefore be intersected with a line segment for the LOR. In this mode, a single Compton camera is sufficient. In this mode, a Compton image can also be made with the photon co-emitted with the beta plus.

In another embodiment, the gammas co-emitted with beta-plus being emitted in all directions of space, it is possible, by windowing the energy of the PET cameras, centered on 1.3 MeV, to filter the 511 KeV and thus, at the end of said windowing of three views at 1.3 MeV, making an imaging at 1.3 MeV of the source is possible.

In another embodiment, said method contains an additional step in which the location of the place of emission of the photons is determined for the radionuclides which are emitters of at least two types of radiations simultaneously (for example $^{22}$Na, $^{41}$Sc) by the intersection between a Compton cone and a LOR.

In another embodiment, said device contains a Compton camera which is capable of measuring the time of flight of the photon in coincidence with the PET emission.

In another embodiment, the intersection of the two objects will generally give two LOR segments 1 cm in length and 3-4 mm in diameter. Furthermore, since the time of arrival of the third photon on the Compton camera is available, it is in most cases possible to exclude one of the two positions due to the TOF, either Compton or PET. In the case where one of the two positions can be excluded, there is a deterministic image without reconstruction of the emission area. Two or three events of this type by Voxel are enough to obtain a perfect image of the object and allow a marked reduction of the dose to be injected for a medical application for example.

According to a feature, the LOR segmentation step of the method of the present invention by relying on the contour delimiting the dense areas allows obtaining LORs of approximately 1 cm. The advantages of this embodiment are numerous, some of which being the significant reduction in the number of fortuitous coincidences, the acceleration of the reconstruction, the enhancement in the image quality, also the cost of the device of the present invention compared to the classical PET and PET TOF.

Advantageously, this embodiment of the invention accelerates the convergence of the reconstruction algorithm and enhances the quality of the reconstructed image.

According to another embodiment, the three views are acquired from three known positions distributed over at least one of the three axes (X, Y, Z) of a trihedron (FIG. 9, the fields of acquisition of said views having at least one overlap area covering the object to be imaged. The purpose here being, using the three Compton views, to locate the dense area.

According to one embodiment, said device contains a method allowing it to make acquisitions according to three distinct Compton views.

In a non-limiting manner, one of the methods would be to insert at least two Compton heads at 90° to each other inside the ring of a PET scanner, the third head being located in the axis of the ring outside the usual PET field of view, the three heads being able to form a direct trihedron centered on the area to be imaged FIG. 9.

Another method would be to have the three Compton heads at 120° to each other outside the ring of the PET each being inclined and aiming at the geometric center of the ring in order to produce a trihedron which samples well all the axes of said trihedron.

In addition, these embodiments can be envisaged in several forms:

In one embodiment, the present invention makes a Kit available to users allowing them to increase the performances of an existing PET scanner by performing a retrofit and including at least one Compton camera. The number of said Compton cameras of the Kit varying according to the nature of the desired mounting. This embodiment allows modifying and enhancing current imagers by allowing them to propose other use options.

In another embodiment, the present invention makes another Kit available allowing it to add a thin diffuser type detector inside an existing PET ring, to achieve a coupling between this diffuser center and the absorber behind and adding a Compton detector.

Another embodiment makes the device available as described in the present invention in a single block and including three Compton cameras and at least two PET cameras.

Said device is able to locate a dense area and to delimit the contour of said dense area.

According to one embodiment, the PET and Compton imaging method is able to implement a PET and Compton tomographic reconstruction method which takes into account at least three distinct views locating the object to be imaged which contains said dense area.

According to another embodiment, the PET and Compton imaging method contains a Compton reconstruction method in which only the intersections of cones derived from 3 different views are retained.

According to one embodiment, the PET and Compton imaging method is able to implement a PET and Compton tomographic reconstruction method which takes into account at least three distinct views locating the object to be imaged, defining the contours of the dense area and guiding the LOR segmentation.

According to another embodiment, the PET and Compton imaging method contains a PET and Compton reconstruction method in which only the intersections of cones derived from 3 different views defining the contours of dense areas guiding the LOR segmentation are retained.

According to another embodiment, the PET/Compton imaging method contains a Compton statistical data reduction process, used in the case where the intensity of the source is identical between several views, to filter the parasitic events for which said source intensity does not satisfy the law of the inverse of the squared distances, not varying as $1/d^2$ on each of the views, where d is the distance from the source to the camera on each of the views. By thus reducing the contributions of the detected photons not derived from said dense area, of the photons derived from phantom sources, of the fortuitous photons, only the true events are retained. The quality of the image is refined and enhanced. Here, an event is true if the photon at its origin actually contributes to the image formation.

The invention further relates to a PET and Compton imager including at least one Compton camera able to produce at least one Compton view, at least two PET cameras able to make coincidence acquisitions for the implementation of the method according to one of the described features.

According to one embodiment, the PET and Compton imager of the present invention includes hybrid PET and Compton cameras. The hybrid PET and Compton camera technologies are taught in the application PCT/EP2019/062805 by the same inventor ("a first module (CP), called "hybrid" module, whose scintillator (2) comprises at least one plate (P1) of scintillator crystal, called fast scintillator crystal, whose time of rise to the light peak is less than 1 ns, said "hybrid" module being able to produce both Compton scattering and absorption of at least part of the gamma radiation for coincidence detection between the events in this first hybrid module (CP) and the events in a second detection module (CP, P) with which this first hybrid module (CP) therefore forms said pair of coincidence detection PET modules) are able to make both types of acquisitions (PET and Compton). Their use facilitates the compactness of the imager (a single camera instead of two or more, in some embodiments).

According to one embodiment, the PET and Compton imager of the present invention is coupled to a third imaging modality (CT-Scan or MRI, etc. as already mentioned in the present application) facilitating the fusion of images for better diagnosis.

The coupling of the PET and Compton imager to a CT-Scan allows, thanks to the CT-Scan, acquiring a real mapping of the attenuation coefficients of the object to be imaged and to be able to apply during the PET and Compton reconstruction an attenuation correction for a desired area.

The coupling of the PET and Compton imager to an MRI (Magnetic Resonance Imaging) type imager allows, among other things, providing a solution to the problem of small field size of MRI imagers, better understanding the operation of an organ by combining the advantages of these two functional imaging modalities, etc.

This embodiment disclosing the coupling of the PET and Compton imager of the present invention with another imaging modality allows simultaneously producing several images with different imaging modalities in the same position. One advantage, by facilitating the production of the image fusions, being to benefit from each of said modalities. Thus, this allows enhancing the quality of the interpretation of the resulting fused images and the accuracy of the positioning of patients in the treatment room, etc.

According to another embodiment of the present invention, at least one of said Compton cameras is mounted on at least one device provided with at least one motor which can successively and/or simultaneously move in all directions of space and to be oriented at the Euler angles, either in automatic mode, or in manual mode. The purpose being to obtain, as easily as possible whatever the geometric configuration, all the desired views of the object to be imaged.

According to one mode of use, the invention further relates to the use of the PET and Compton imager, in healthcare, in the veterinary field and in industry.

In a non-limiting manner, the device of the present invention makes available to users numerous use options which allow the user to envisage, without additional constraints, imaging very large-sized objects (elephants, etc.).

According to another mode of use, the user has at his/her disposal other use options for small-sized objects, for which the current imagers do not offer solutions.

These use options are mainly due to the absence of mechanical collimators, to the accuracy of location of the sources, and to the low number of photons/pixels required to reconstruct the image.

In addition, in an unprecedented manner, the invention makes available to users several types of imaging enhancement kit, in order to reversibly transform imagers (for example PET imagers, CT-Scan imagers, MRI, etc.) making them compatible with the method according to one of the characteristics described above.

In a non-limiting manner, said enhancement kit contains, on the one hand, a device able to produce at least three distinct Compton views along the three directions of space and, on the other hand a reconstruction module implementing a reconstruction algorithm combining the acquisitions of the PET imager with those of said Compton three-view device for the implementation of the method according to the features described above.

In a non-limiting manner, said enhancement kit contains, on the one hand, a device able to produce at least three distinct Compton views along the three directions of space, at least two PET cameras and, on the other hand a reconstruction module implementing a reconstruction algorithm combining the acquisitions of the CT-Scan imager and of said Compton three-view device and two PET cameras for the implementation of the method according to the features described above.

In a non-limiting manner, said enhancement kit contains, on the one hand, a device able to produce at least three distinct Compton views along the three directions of space, at least two PET cameras and, on the other hand a reconstruction module implementing a reconstruction algorithm combining the acquisitions of the MRI imager with those of said device with three Compton views and two PET cameras for the implementation of the method according to the features described above.

Thus, the present invention also provides a kit for enhancing existing devices using means (physical or human, depending on the risks) for bringing the Compton cameras closer to the object to be observed, so as to obtain a segmentation of the LORs less than or equal to 1 cm.

Several types of combinations can be envisaged in the form of a kit. Those benefiting from the features of the present invention and modifying any imager also fall within the scope of the present invention.

It is easily understood upon reading the present application that the features of the present invention, as generally described and illustrated in the figures, can be arranged and designed according to a wide variety of different configurations. Thus, the description of the present invention and the accompanying figures are not intended to limit the scope of the invention, but simply represent selected embodiments.

Those skilled in the art will understand that the technical characteristics of a given embodiment can actually be combined with characteristics of another embodiment unless the reverse is explicitly mentioned or unless it is be obvious that these characteristics are incompatible. In addition, the technical characteristics described in a given embodiment can be isolated from the other characteristics of this embodiment unless the reverse is explicitly mentioned.

Finally, those skilled in the art will understand that the information contained in the figures, in particular those of FIGS. 1 to 3d, will be technical information that can be incorporated into the present text as an appendix.

It should be obvious to those skilled in the art that the present invention allows embodiments in many other specific forms without departing from the field defined by the requested protection, they should be considered as illustration and the invention should not be limited to the details given above.

The invention claimed is:

1. A PET and Compton imaging method implemented by a device including at least two facing PET modules, wherein it comprises at least one Compton camera arranged outside a plane containing said PET modules for forming a trihedron with said PET modules and producing at least one Compton view, the acquisition fields of said PET and Compton views having at least one overlap area covering the object to be imaged, the method comprising:
   acquisitions according to three distinct Compton views;
   location of a dense area and its three-dimensional contour on said Compton views;
   computation of a 3D map of the probability of detection of the presence of a source from said Compton views;
   coincidence detection by the PET cameras and association of a response line (LOR); and
   segmentation of LORs crossing the dense area by using the detection probability determined by said Compton views.

2. The PET and Compton imaging method according to claim 1, wherein it comprises an additional step of filtering the LORs crossing a dense area by considering the probability of association of a LOR with said dense area.

3. The PET and Compton imaging method according to claim 1, wherein in the areas of the image having high contrast, the LORs are segmented over lengths less than or equal to two centimeters.

4. The PET and Compton imaging method according to claim 1, wherein it contains a PET and Compton tomographic reconstruction method taking into account at least three distinct views locating the object to be imaged, defining the contours of the dense area and guiding the segmentation of the LORs.

5. The PET and Compton imaging method according to claim 1, wherein it contains a PET and Compton reconstruction method wherein only the intersections of cones derived from 3 different Compton views locating the object to be imaged are retained, defining the contours of the dense area and guiding the segmentation of the LORs.

6. The PET and Compton imaging method according to claim 1, wherein it contains an additional step wherein the location of the place of emission of the photons is determined by the intersection between a Compton cone and a LOR.

7. The PET and Compton imaging method according to claim 1, wherein it contains an additional step wherein the location of the place of emission of the photons is determined for the radionuclides which are emitting at least two types of radiation, particularly a positron and a gamma ray, by the intersection between a Compton cone and a LOR.

8. The PET and Compton imaging method according to claim 6, wherein the Compton camera is capable of measuring the time of flight of the photon in coincidence with the PET emission.

9. A PET and Compton imager including at least one Compton camera able to produce at least three Compton views, at least two PET cameras able to make coincidence acquisitions for the implementation of the method according to claim 1.

10. The PET and Compton imager according to claim 9, wherein it includes hybrid PET/Compton cameras.

11. The PET and Compton imager according to claim 9, wherein it is coupled to a third imaging modality (for example CT-Scan or MRI) facilitating the fusion of images for a better diagnosis.

12. The PET and Compton imager according to claim 10, wherein at least one of said Compton cameras is mounted on at least one device provided with at least one motor which can successively and/or simultaneously move in all directions of space and be oriented at Euler angles, either in automatic mode or in manual mode.

13. A use of the PET and Compton imager according to claim 9 for producing images with at least one tracer able to generate photons of different energies.

14. An imaging enhancement kit, for transforming PET CT-Scan, PET/CT and/or PET/MRI imagers, wherein it contains, on the one hand, a device able to produce at least three distinct Compton views along the three directions of space, at least two PET cameras and on the other hand a reconstruction module implementing a reconstruction algorithm combining the acquisitions of the PET imager and of said device with three Compton views for the implementation of the method according to claim 1.

15. An imaging enhancement kit according to claim 14, wherein it comprises a reconstruction module implementing a reconstruction algorithm combining the acquisitions of the MRI imager and of said device with three Compton views and two PET cameras.

16. A PET and Compton imaging method implemented by a device including at least two facing PET modules, wherein it comprises at least one Compton camera arranged outside a plane containing said PET modules for forming a trihedron with said PET modules and producing at least one Compton view, the acquisition fields of said PET and Compton views having at least one overlap area covering the object to be imaged, said device allowing the following steps to be carried out:
   acquisition of at least one Compton view;
   location of a dense area and its contour on said Compton view;
   Computation of the 2D map of the probability of detection of the presence of a source from said Compton view of said Compton camera;
   Coincidence detection by the PET cameras and association of a response line (LOR); and
   Segmentation of LORs crossing the dense area by using the detection probability determined by said Compton view.

* * * * *